United States Patent
Miyama

(10) Patent No.: US 7,961,566 B2
(45) Date of Patent: Jun. 14, 2011

(54) OPTICAL DISC PLAYBACK DEVICE

(75) Inventor: Issei Miyama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 357 days.

(21) Appl. No.: 12/292,105

(22) Filed: Nov. 12, 2008

(65) Prior Publication Data

US 2009/0122683 A1     May 14, 2009

(30) Foreign Application Priority Data

Nov. 13, 2007   (JP) ................................. 2007-294680

(51) Int. Cl.
G11B 7/00 (2006.01)
(52) U.S. Cl. .................................. 369/44.27; 369/44.25
(58) Field of Classification Search ............... 369/44.25, 369/44.27
See application file for complete search history.

(56) References Cited

U.S. PATENT DOCUMENTS

2005/0270916 A1   12/2005   Maeda ....................... 369/44.25

FOREIGN PATENT DOCUMENTS

| GB | 2 158 611 A | 11/1985 |
| JP | 8-221773 | 8/1996 |
| JP | 2002-312959 | 10/2002 |
| JP | 2005-346802 A | 9/2006 |

*Primary Examiner* — Van N Chow
(74) *Attorney, Agent, or Firm* — Morgan, Lewis & Bockius LLP

(57) ABSTRACT

An optical disc playback device has a signal generating section, a shift set section, a shift drive section, a position storage section, an ascent/descent set section and an ascent/descent drive section. The signal generating section generates a focusing error signal and a tracking error signal and also outputs a RF signal. The shift set section sets the shift position of a pickup based on the tracking error signal. The shift drive section drives the pickup such that it is located at the set shift position. The position storage section makes the ascent/descent position of the pickup correspond to the shift position, and previously stores the relevant information. The ascent/descent set section determines an ascent/descent position corresponding to the set shift position by reading it from the position storage section. The ascent/descent drive section drives the pickup such that it is located at the determined ascent/descent position.

8 Claims, 7 Drawing Sheets

OPTICAL DISC PLAYBACK DEVICE

This application is based on Japanese Patent Application No. 2007-294680 filed on Nov. 13, 2007, the contents of which are hereby incorporated by reference.

BACKGROUND OF THE INVENTION

1. Field of the Invention

The present invention relates to an optical disc playback device that incorporates a pickup shining laser light from a light source onto an optical disc and converting light reflected from the optical disc into an electrical signal and that reads, through the pickup, information previously stored on the optical disc to achieve playback.

2. Description of Related Art

Conventionally, an optical disc playback device that reads information recorded on an optical disc such as a CD (compact disc) or a DVD (digital versatile disc) to achieve playback performs focus control for directing the focus position of emitted laser light to the recording surface of the optical disc. When this focus control is improperly performed, the information cannot be properly read from the optical disc. Thus, in order to perform the focus control properly, various devices, methods and the like are proposed.

For example, an optical disc device is disclosed in JP-A-2005-346802 that, when a difference between the address of a position from which current data is read on an optical disc and an address that a focus bias was last adjusted at and that is stored in a buffer as focus bias adjustment information exceeds a predetermined amount or when a seek is performed, determines whether the focus bias that was last adjusted deviates from an optimum value due to, for example, warpage of the optical disc and readjusts the focus bias if it deviates from the optimum value.

Disadvantageously, however, with the optical disc device described above, it is necessary to stop playback during readjustment of the focus bias. This may cause inconvenience. Since the focus bias is readjusted only when, for example, it is determined that the focus bias deviates from the optimum value, when it is not determined that the focus bias deviates from the optimum value, it is likely that focus control cannot be performed properly.

In particular, when an optical disc is eccentric, the focus position of light emitted from a light source deviates from the center position of a track formed on the optical disc every rotational period of the optical disc. Thus, it is likely that focus control cannot be performed properly.

SUMMARY OF THE INVENTION

An object of the present invention is to provide an optical disc playback device that can properly perform focus control during playback.

According to an aspect of the present invention, there is provided an optical disc playback device that includes a pickup shining laser light from a light source onto an optical disc and converting light reflected from the optical disc into an electrical signal and that reads, through the pickup, information previously stored on the optical disc to achieve playback. The optical disc playback device includes: a signal generating section generating, through the pick up, a focusing error signal indicating the amount of displacement of the focus position of light emitted from the light source with respect to the position of the recording surface of the optical disc and a tracking error signal indicating the amount of displacement of the focus position of the light emitted from the light source with respect to the center position of a track formed on the optical disc and outputting a RF (radio frequency) signal; a shift set section setting, based on the tracking error signal generated by the signal generating section, a shift position that is a position of the pickup in a radial direction of the optical disc; a shift drive section driving the pickup in the radial direction of the optical disc such that the pickup is located at the shift position set by the shift set section; a position storage section making an ascent/descent position of the pickup in a direction in which the pickup approaches or moves away from the optical disc correspond to the shift position and previously storing information of the ascent/descent position; an ascent/descent set section determining the ascent/descent position corresponding to the shift position set by the shift set section by reading the information of the ascent/descent position from the position storage section; and an ascent/descent drive section driving the pickup in the direction in which the pickup approaches or moves away from the optical disc such that the pickup is located at the ascent/descent position determined by the ascent/descent set section.

DETAILED DESCRIPTION OF PREFERRED EMBODIMENTS

Figure 1:
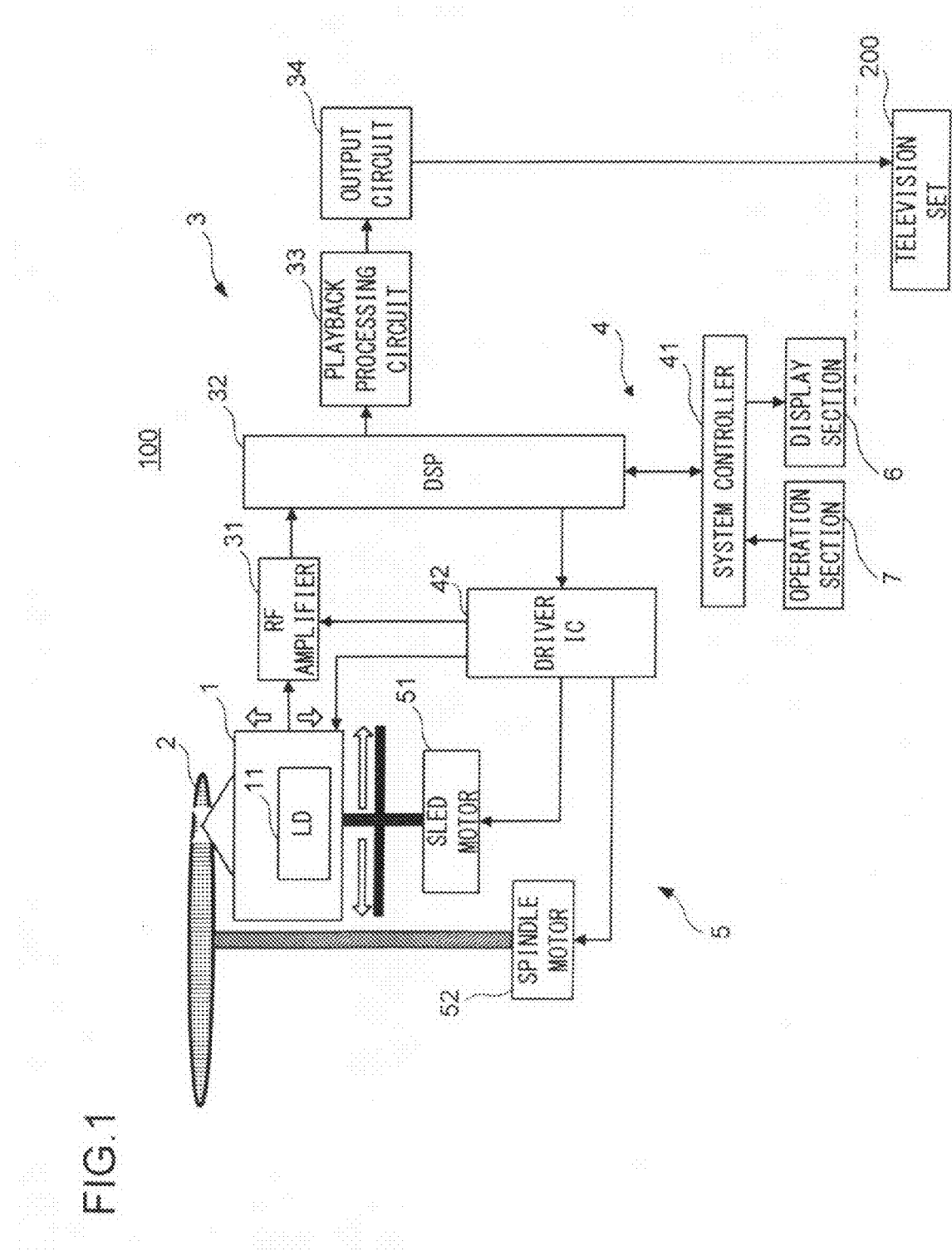
FIG. 1 is a diagram showing an example of the configuration of a DVD player according to the present invention.

Embodiments of the present invention will be described below with reference to the accompanying drawings. FIG. 1 is a diagram showing an example of the configuration of a DVD player according to the invention. The DVD player 100 (equivalent to an optical disc playback device) reads information previously stored on an optical disc 2 such as a CD or a DVD to achieve playback; it has an optical pickup 1, an output device 3, a control device 4, a drive device 5, a display section 6 and an operation section 7.

The DVD player 100 is configured such that it can communicate with a television set 200. The television set 200 has a speaker and a monitor (both not shown); it outputs information such as sound information and image information from the DVD player 100 through the speaker and monitor.

The optical pickup 1 (equivalent to a pickup) has a LD (laser diode) 11; it shines laser light from the LD 11 onto the optical disc 2 to read various types of information such as sound information and image information stored on the optical disc 2. The optical pickup 1 converts, through a divided light sensor 16 (see FIG. 2A), into a plurality of electrical signals, light reflected from the optical disc 2 from which playback is performed, thereby producing a tracking error signal, a focusing error signal and a RF signal to perform tracking servo control (for accurately following a track formed on the optical disc 2) and focusing servo control (for focusing on a recording surface formed on the optical disc 2).

The LD 11 (equivalent to a light source) shines laser light onto the optical disc 2 so that information stored on the optical disc 2 is read. The optical pickup 1 is configured such that it can be shifted, by a sled motor 51, in a radial direction of and in a vertical direction (in a direction in which the optical pickup 1 approaches or moves away from the optical disc 2) of the optical disc 2.

The optical disc 2 is formed by a CD (compact disc), a DVD (digital versatile disc) or the like; it previously stores image information, sound information and other information.

The output device 3 converts information such as sound information and image information from the optical pickup 1 into sound and images, and feeds them to the unillustrated speaker and monitor, respectively, provided in the television set 200; it has a RF (radio frequency) amplifier 31, a DSP (digital signal processor) 32, a playback processing circuit 33 and an output circuit 34. The RF amplifier 31 amplifies a signal corresponding to sound information, image information and other information from the optical pickup 1.

The DSP 32 and the playback processing circuit 33 perform various types of information processing for playback (for example, image processing) on a signal from the RF amplifier 31. The output circuit 34 performs digital-to-analog conversion processing and other processing on information from the playback processing circuit 33 so as to feed the resulting information to the unillustrated speaker and monitor provided in the television set 20.

The control device 4 controls the operations of the optical pickup 1 and the drive device 5 based on an instruction received through the operation of the operation section 7; it has a system controller 41 and a driver IC 42. The system controller 41 receives information from the operation section 7 to transfer it to the DSP 32, and also transfer information from the DSP 32 to the display section 6.

The driver IC 42 (equivalent to a part of a shift drive section and a part of an ascent/descent drive section) controls the operations of the optical pickup 1 and the drive device 5 based on an instruction from the DSP 32. Specifically, the driver IC 42 controls a current fed to the LD 11 provided in the optical pickup 1 and also controls the operations of the sled motor 51 and a spindle motor 52 included in the drive device 5.

The drive device 5 has the sled motor 51 and the spindle motor 52. The sled motor 51 (equivalent to a part of the shift drive section and a part of the ascent/descent drive section) shifts, based on an instruction from the driver IC 42, the optical pickup 1 in a radial direction of and in a vertical direction of the optical disc 2. The spindle motor 52 drives the rotation of the optical disc 2 based on an instruction from the driver IC 42.

The display section 6 has an LCD (liquid crystal display) and the like; it displays information from the DSP 32 such that the information can be visually identified from the outside. The operation section 7 has various operation buttons and the like; it receives an instruction through the operation of a user to output an operation signal for the DSP 32.

Figure 2A:
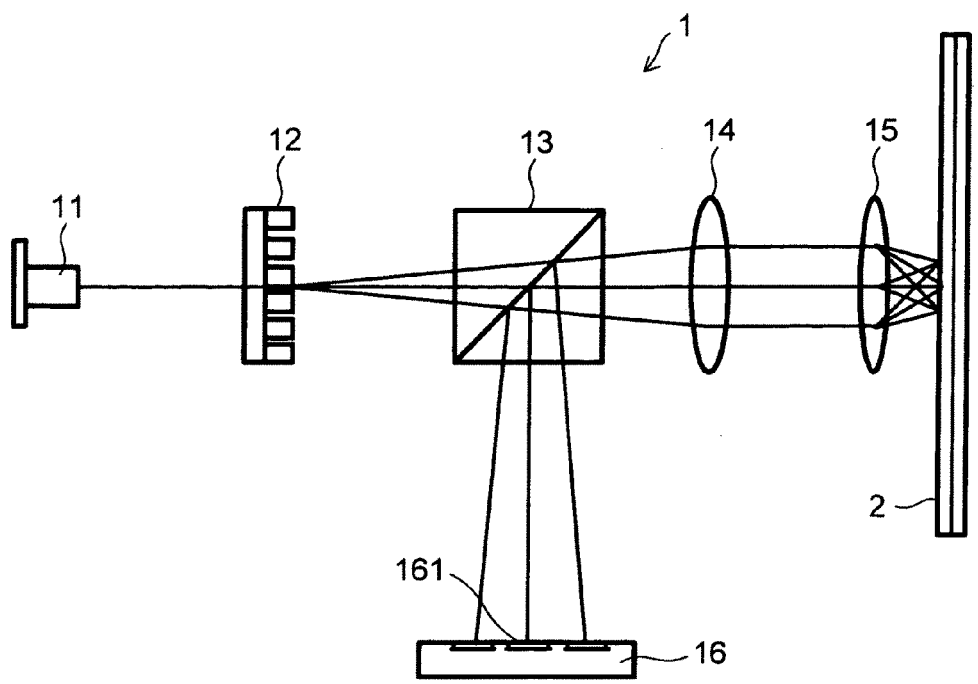
FIGS. 2A and 2B are diagrams showing an example of the configuration of an optical pickup shown in FIG. 1.
Figure 2B:
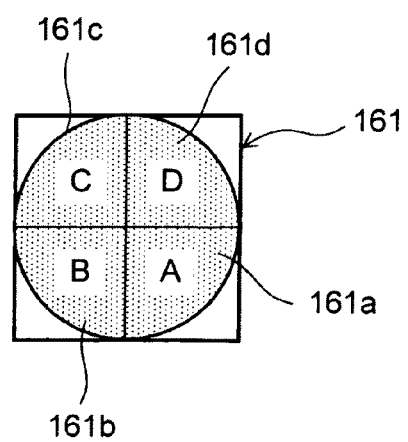

FIGS. 2A and 2B are diagrams showing an example of the configuration of the optical pickup shown in FIG. 1. As shown in FIG. 2A, the optical pickup 1 has the LD 11 described with reference to FIG. 1 and also has diffraction means 12, a beam splitter 13, a collimator lens 14, an objective lens 15 and the divided light sensor 16. The optical pickup 1 has a tracking error signal generating circuit 17, a focusing error signal generating circuit 18 and a RF signal generating circuit 19, all of which are not shown in the figure (see FIGS. 3A to 3C). The diffraction means (grating) 12 diffracts laser light emitted from the LD 11 to direct the diffracted light to the beam splitter 13.

The beam splitter 13 transmits the diffracted light from the diffraction means 12, and also reflects the light reflected from the optical disc 2 to direct it to the divided light sensor 16. The collimator lens 14 receives, through the diffraction means 12 and the beam splitter 13, the laser light from the LD 11, and produces a parallel pencil of light. The objective lens 15 focuses the laser light onto the signal surface of the optical disc 2.

The divided light sensor 16 has a main light sensor 161; it receives, through the objective lens 15, the collimator lens 14 and the beam splitter 13, the light reflected from the optical disc 2, and outputs an electrical signal corresponding to the amount of received light. The unillustrated tracking error signal generating circuit 17, the focusing error signal generating circuit 18 and the RF signal generating circuit 19 generate, based on the electrical signals from the divided light sensor 16, the tracking error signal, the focusing error signal and the RF signal, respectively.

FIG. 2B is a plan view showing an example of the main light sensor 161 shown in FIG. 2A. The main light sensor 161 is composed of optical sensors 161*a* to 161*d* formed by vertically and horizontally dividing the main light sensor 161 into four equal portions; it receives zero-order diffracted light (a main beam).

Figure 3A:
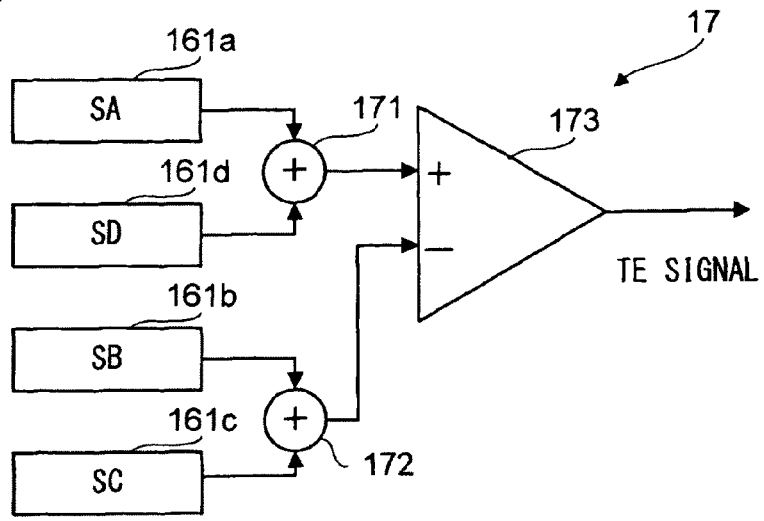
FIGS. 3A to 3C are diagrams showing examples of the configuration of a tracking error signal generating circuit, a focusing error signal generating circuit and a RF signal generating circuit that are arranged in appropriate portions of the optical pickup shown in FIG. 1.
Figure 3B:
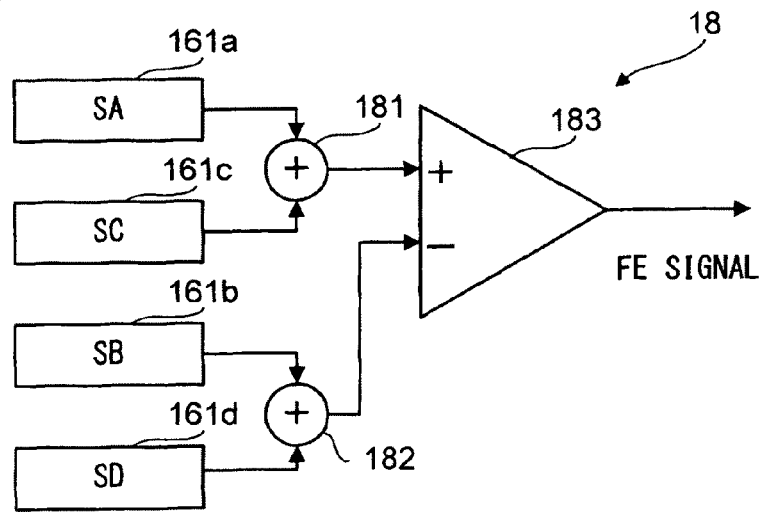
Figure 3C:
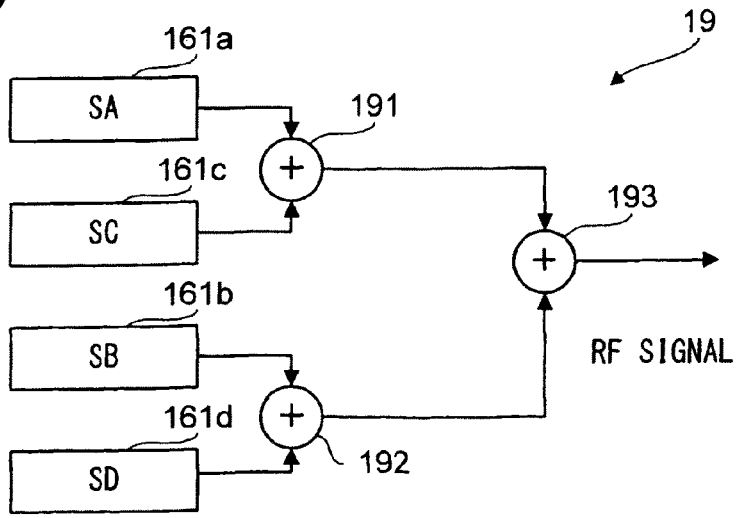

The optical sensors 161*a* to 161*d* of the main light sensor 161 generate electrical signals SA, SB, SC and SD, respectively, corresponding to the amount of received light, and feeds them to the tracking error signal generating circuit 17, the focusing error signal generating circuit 18 and the RF signal generating circuit 19 (see FIGS. 3A to 3C).

FIGS. 3A to 3C are diagrams showing examples of the configuration of the tracking error signal generating circuit 17, the focusing error signal generating circuit 18 and the RF signal generating circuit 19 that are arranged in appropriate portions of the optical pickup 1 shown in FIG. 1. The tracking error signal generating circuit 17, the focusing error signal generating circuit 18 and the RF signal generating circuit 19 receive the four electrical signals SA, SB, SC and SD from the divided light sensor 16, respectively.

The tracking error signal generating circuit 17 (equivalent to a part of a signal generating circuit) has adder circuits 171 and 172 and a differential amplifier 173. The adder circuit 171 adds the two electrical signals SA and SD, and the adder circuit 172 adds the two electrical signals SB and SC; the adder circuits 171 and 172 feed signals obtained by performing the additions to the amplifier circuit 173.

The differential amplifier 173 generates, based on the signals from the adder circuits 171 and 172, the tracking error signal TE (TE=(SA+SD)−(SB+SC)) from the four electrical signals SA, SB, SC and SD corresponding to the main beam out of the light reflected from the optical disc 2, and feeds the tracking error signal TE to the DSP 32.

The focusing error signal generating circuit 18 (equivalent to a part of the signal generating circuit) has adder circuits 181 and 182 and a differential amplifier 183. The adder circuit 181 adds the two electrical signals SA and SC, and the adder circuit 182 adds the two electrical signals SB and SD; the adder circuits 181 and 182 feed signals obtained by performing the additions to the amplifier circuit 183.

The differential amplifier 183 generates, based on the signals from the adder circuits 181 and 182, the focusing error signal FE (FE=(SA+SC)−(SB+SD)) from the four electrical signals SA, SB, SC and SD corresponding to the main beam out of the light reflected from the optical disc 2, and feeds the focusing error signal FE to the DSP 32.

The RF signal generating circuit 19 (equivalent to a part of the signal generating circuit) has adder circuits 191, 192 and 193. The adder circuit 191 adds the two electrical signals SA and SC, and the adder circuit 192 adds the two electrical signals SB and SD; the adder circuits 191 and 192 feed signals obtained by performing the additions to the adder circuit 193.

The adder circuit 193 adds the signals from the adder circuits 191 and 192, and generates the RF signal (=(SA+SC)−(SB+SD)) from the four electrical signals SA, SB, SC and SD corresponding to the main beam out of the light reflected from the optical disc 2, and feeds the RF signal to the DSP 32.

Figure 4:
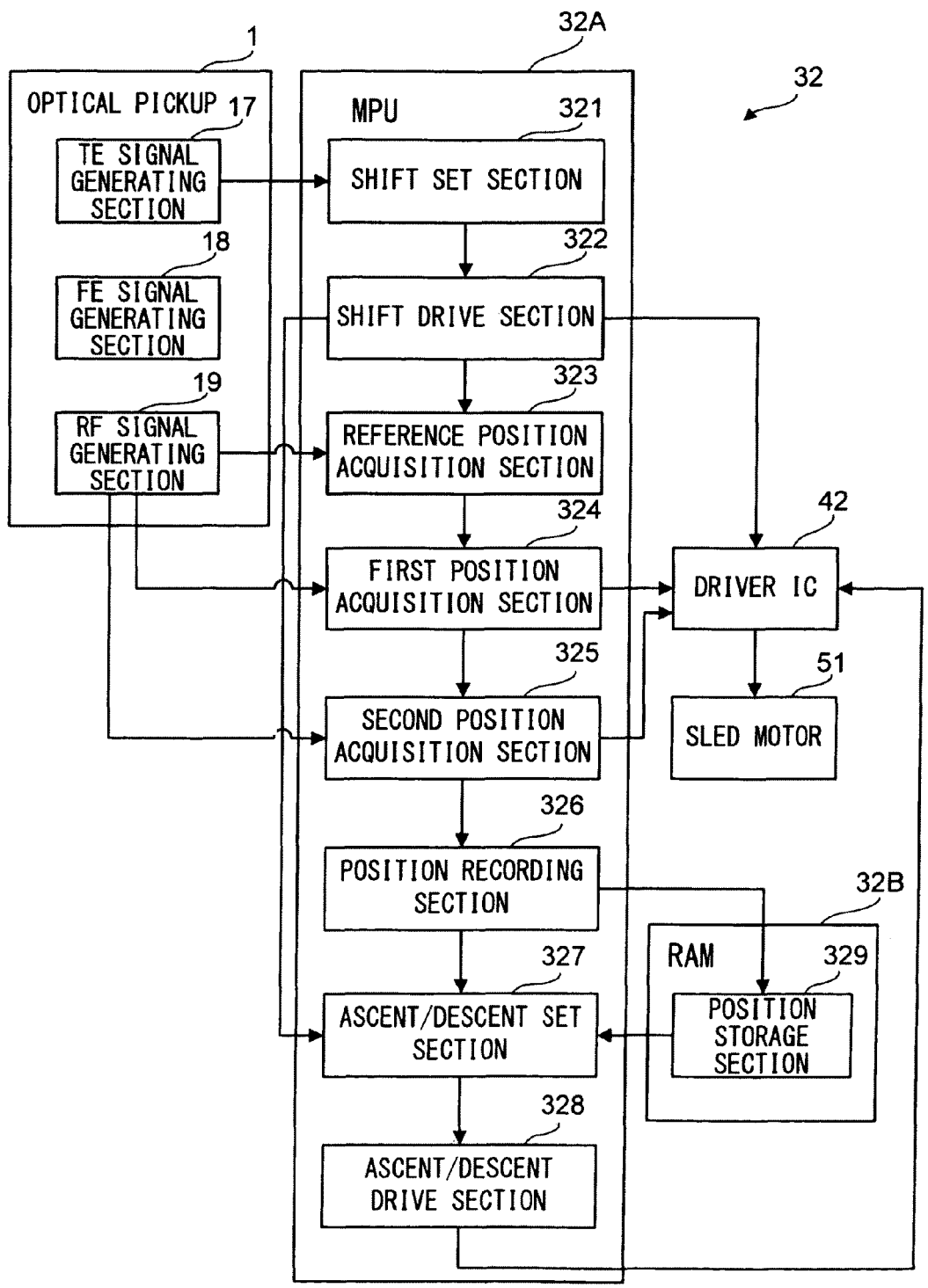
FIG. 4 is a diagram showing an example of the function and configuration of a main portion (mainly a DSP) of the DVD player according to the invention.

FIG. 4 is a diagram showing an example of the function and configuration of a main portion (mainly the DSP 32) of the DVD player 100 according to the present invention. The DSP 32 has an MPU (micro processing unit) 32A, a RAM (random access memory) 32B and an unillustrated ROM (read only memory). The MPU 32A has, in terms of function, a shift set section 321, the shift drive section 322, a reference position acquisition section 323, a first position acquisition section 324, a second position acquisition section 325, a position recording section 326, an ascent/descent set section 327 and the ascent/descent drive section 328. The RAM 32B has, in terms of function, a position storage section 329.

Here, the MPU 32A functions, by reading and executing a program previously stored in the ROM or the like, as function units such as the shift set section 321, the shift drive section 322, the reference position acquisition section 323, the first position acquisition section 324, the second position acquisition section 325, the position recording section 326, the ascent/descent set section 327 and the ascent/descent drive section 328, and makes the RAM 32B function as function units such as the position storage section 329.

Of various types of data stored in the RAM 32B and the unillustrated ROM, data that can be stored in a removable storage medium may be stored such that it can be read by a drive such as a hard disk drive, an optical disc drive, a flexible disk drive, a silicon disk drive or a cassette medium reading device. In this case, a hard disk, an optical disc, a flexible disk, a CD, a DVD, a semiconductor memory or the like serves as a recording medium.

The position storage section 329 makes an ascent/descent position PF of the optical pickup 1 in a direction in which it approaches or moves away from the optical disc 2 correspond to a shift position PS of the optical pickup 1 in a radial direction of the optical disc 2, and stores information of the ascent/descent position PF and the shift position PS previously (that is, before the information is stored on the optical disc 2 and read therefrom). The information of the ascent/descent position PF and the shift position PS that is stored in the position storage section 329 is recorded (written) by the position recording section 326 before the information is stored on the optical disc 2 and read therefrom, and is read by the ascent/descent set section 327 when the information is stored on the optical disc 2 and read therefrom.

The shift set section 321 sets, based on the tracking error signal TE generated by the tracking error signal generating circuit 17, the shift position PS of the optical pickup 1 in the radial direction of the optical disc 2.

The shift drive section 322 drives, through the driver IC 42 and the sled motor 51, the optical pickup 1 in the radial direction of the optical disc 2 such that the optical pickup 1 is located at the shift position PS set by the shift set section 321.

Figure 5A:
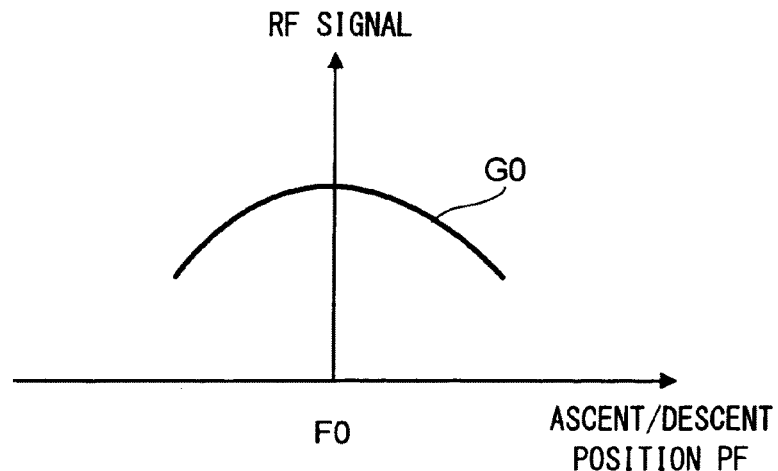
FIGS. 5A to 5C are graphs showing examples of a reference ascent/descent position F0, a first ascent/descent position FA and a second ascent/descent position FB.

The reference position acquisition section 323 determines a reference ascent/descent position F0 as an appropriate ascent/descent position PF based on the RF signal fed from the RF signal generating circuit 19 with the optical pickup 1 driven, by the shift drive section 322, to a reference shift position S0 that is the shift position PS set by the shift set section 321 (see FIG. 5A). The reference position acquisition section 323 determines an ascent/descent position PF as the reference ascent/descent position F0 when the level of the RF signal fed from the optical pickup 1 is the highest level.

Figure 5B:
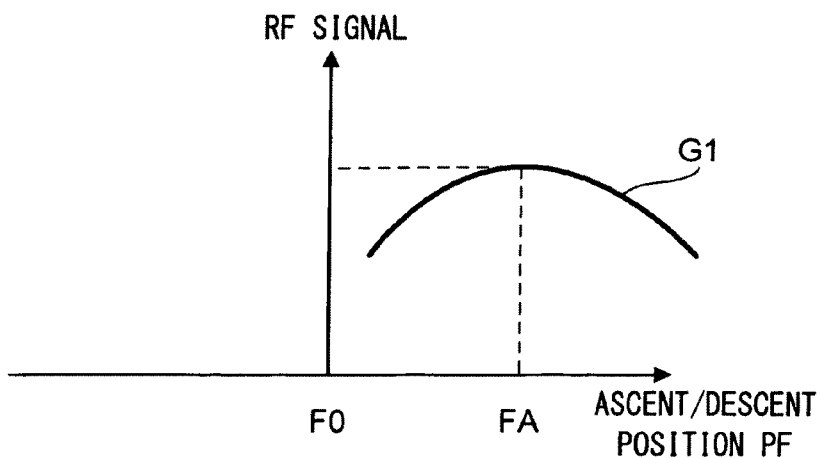

The first position acquisition section 324 determines a first ascent/descent position FA as an appropriate ascent/descent position PF based on the RF signal fed from the RF signal generating circuit 19 with the optical pickup 1 shifted, through the shift drive section 322, to a first shift position SA to which the optical pickup 1 is shifted from the reference shift position S0 in a radially outward direction by a predetermined first travel distance (for example, 100 μm) (see FIG. 5B). The first position acquisition section 324 determines an ascent/descent position PF as the first ascent/descent position FA when the level of the RF signal fed from the optical pickup 1 is the highest level.

Figure 5C:
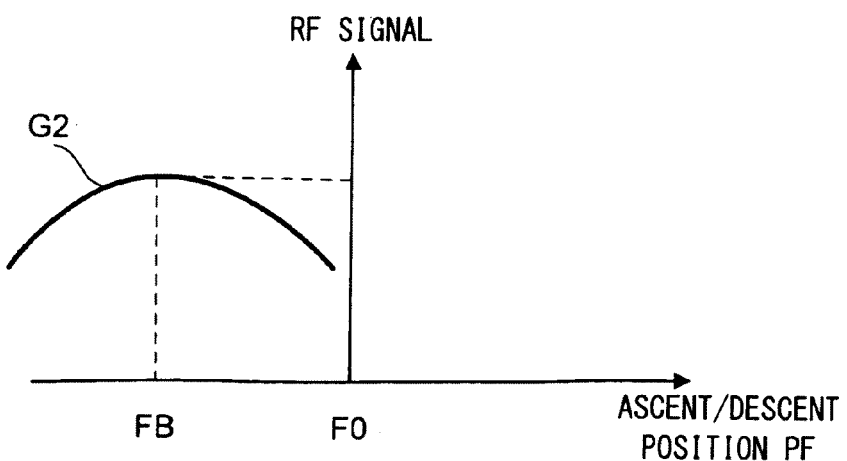

The second position acquisition section 325 determines a second ascent/descent position FB as an appropriate ascent/descent position PF based on the RF signal fed from the RF signal generating circuit 19 with the optical pickup 1 shifted, through the shift drive section 322, to a second shift position SB to which the optical pickup 1 is shifted from the reference shift position S0 in a radially inward direction by a predetermined second travel distance (for example, 100 μm) (see FIG. 5C). The second position acquisition section 325 determines an ascent/descent position PF as the second ascent/descent position FB when the level of the RF signal fed from the optical pickup 1 is the highest level.

FIGS. 5A to 5C are graphs showing examples of the reference ascent/descent position F0, the first ascent/descent position FA and the second ascent/descent position FB. In FIGS. 5A to 5C, the horizontal axis represents the ascent/descent position PF, and the vertical axis represents the level of the RF signal fed from the RF signal generating circuit 19. FIG. 5A is a graph G0 showing an example of the relationship between the ascent/descent position PF and the level of the RF signal with the optical pickup 1 driven to the reference shift position S0. FIG. 5B is a graph G1 showing an example of the relationship between the ascent/descent position PF and the level of the RF signal with the optical pickup 1 shifted to the first shift position SA to which the optical pickup 1 is shifted from the reference shift position S0 in a radially outward direction by the first travel distance (here, 100 μm). FIG. 5C is a graph G2 showing an example of the relationship between the ascent/descent position PF and the level of the RF signal with the optical pickup 1 shifted from the reference shift position S0 in a radially inward direction by the second travel distance (here, 100 μm).

As shown in FIGS. 5A to 5C, the graphs G0 to G2 are convex upward. The reference ascent/descent position F0, the first ascent/descent position FA and the second ascent/descent position FB are determined as ascent/descent positions PF at which the level of the RF signal fed from the optical pickup 1 is the highest level, by the reference position acquisition section 323, the first position acquisition section 324 and the second position acquisition section 325, respectively. For convenience, in this embodiment, a description will be given of a case where, as shown in the figures, the reference ascent/descent position F0, the first ascent/descent position FA and the second ascent/descent position FB satisfy formula (1) below.

(second ascent/descent position $FB$)<(reference ascent/descent position $F0$)<(first ascent/descent position $FA$)     (1)

With reference back to FIG. 4, the function and configuration of the MPU 32A will be described. Based on the reference shift position S0, the first shift position SA, the second shift position SB, the reference ascent/descent position F0, the first ascent/descent position FA and the second ascent/descent position FB, the position recording section 326 determines the shift position PS and the ascent/descent position PF that are stored in the position storage section 329, and records (writes) the determined shift position PS and ascent/descent position PF in the position storage section 329.

Figure 6A:
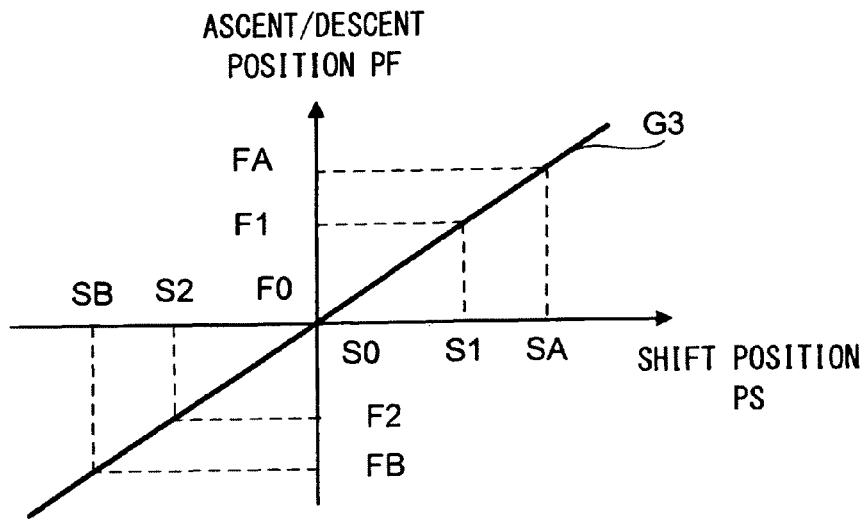
FIGS. 6A and 6B are a graph G3 showing an example of the relationship between a shift position PS recorded in a position storage section by a position recording section and an ascent/descent position PF and graphs G4 and G5 showing an example of the relationship between a shift position PS set by a shift set section and an ascent/descent position PF set by an ascent/descent section when an optical disc is eccentric.

FIG. 6A is a graph G3 showing an example of the relationship between the shift position PS and the ascent/descent position PF that are stored in the position storage section 329 by the position recording section 326. In the figure, the horizontal axis represents the shift position PS, and the vertical axis represents the ascent/descent position PF. As shown in the figure, the graph G3 is a straight line that passes through the origin at which the shift position PS is located at the reference shift position S0 and the ascent/descent position PF is located at the reference ascent/descent position F0, and that rises rightward. The graph G3 passes through both a point at which the shift position PS is located at the first shift position SA to which the optical pickup 1 is shifted from the reference shift position S0 in a radially outward direction (on the positive side) by the first travel distance and the ascent/descent position PF is located at the first ascent/descent position FA and a point at which the shift position PS is located at the second shift position SB to which the optical pickup 1 is shifted from the reference shift position S0 in a radially inward direction (on the negative side) by the second travel distance and the ascent/descent position PF is located at the second ascent/descent position FB.

The position recording section 326 determines equation (2) indicating a straight line corresponding to the graph G3, and determines, based on equation (2), the shift position PS and the ascent/descent position PF that are stored in the position storage section 329.

(ascent/descent position $PF$)=$\alpha$×(shift position $PS$)+$\beta$, where $\alpha$ and $\beta$ are constants.     (2)

With reference back to FIG. 4, the function and configuration of the MPU 32A will be described. The ascent/descent set section 327 determines the ascent/descent position PF corresponding to the shift position PS set by the shift set section 321 by reading it from the position storage section 329. Although a description will be given of a case where the ascent/descent set section 327 determines the ascent/descent position PF corresponding to the shift position PS set by the shift set section 321 by reading it from the position storage section 329, the ascent/descent set section 327 may use equation (2) to determine the ascent/descent position PF corresponding to the shift position PS set by the shift set section 321.

The ascent/descent drive section 328 drives, through the driver IC 42 and the sled motor 51, the optical pickup 1 in a direction in which it approaches or moves away from the optical disc 2 such that the optical pickup 1 is located at the ascent/descent position PF determined by the ascent/descent set section 327.

Figure 6B:
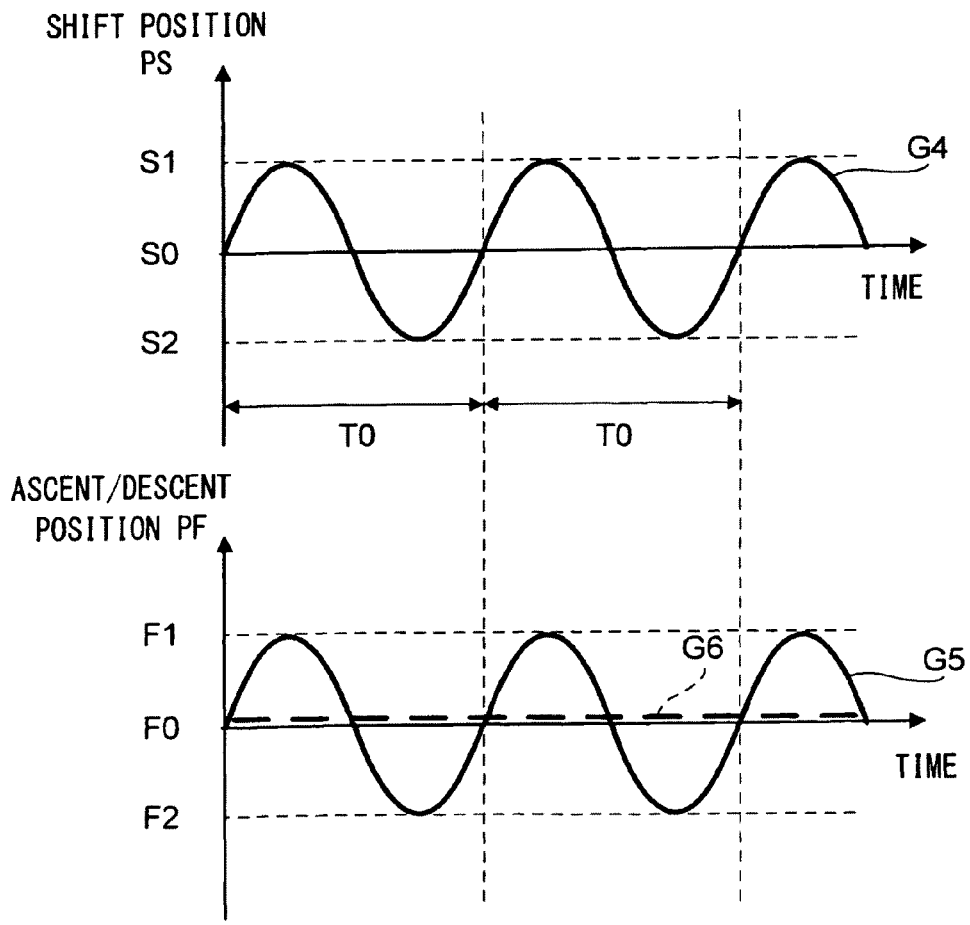

FIG. 6B is graphs G4 and G5 showing an example of the relationship between the shift position PS set by the shift set section 321 and the ascent/descent position PF set by the ascent/descent set section 327 when the optical disc 2 is eccentric. In the figure, the horizontal axis represents time, and the vertical axis represents the shift position PS in the upper graph G4 and the ascent/descent position PF in the lower graph G5.

Since the optical disc 2 is eccentric, like the graph G4 shown in FIG. 6B, the shift position PS set by the shift set section 321 varies according to a sinusoidal wave having the same period as the rotation period T0 of the optical disc 2. Here, the sinusoidal wave of the shift position PS shown in the graph G4 has the maximum value S1, the median value S0 and the minimum value S2.

Thus, like the graph G5 shown in FIG. 6B, the ascent/descent position PF set by the ascent/descent set section 327 varies according to a sinusoidal wave having the same period as the rotation period T0 of the optical disc 2. Here, the sinusoidal wave of the ascent/descent position PF shown in the graph G5 has the maximum value F1, the median value F0 and the minimum value F2. The median values S0 and F0 are equal to the reference shift position S0 and the reference ascent/descent position F0, respectively, shown in FIG. 6A. The shift positions PS and the ascent/descent positions PF corresponding to the maximum values S1 and F1 and the minimum values S2 and F2 are plotted on the graph G3 shown in FIG. 6A.

As described above, even when the optical disc 2 is eccentric, the optical pickup 1 is driven by the ascent/descent drive section 328 to the appropriate ascent/descent position PF set by the ascent/descent set section 327, with the result that focus control can be properly achieved. On the other hand, as shown in the graph G6 of FIG. 6B, the ascent/descent position PF of the optical pickup 1 is conventionally fixed at a constant value (here, the reference ascent/descent position F0), with the result that focus control cannot be properly achieved.

Figure 7:
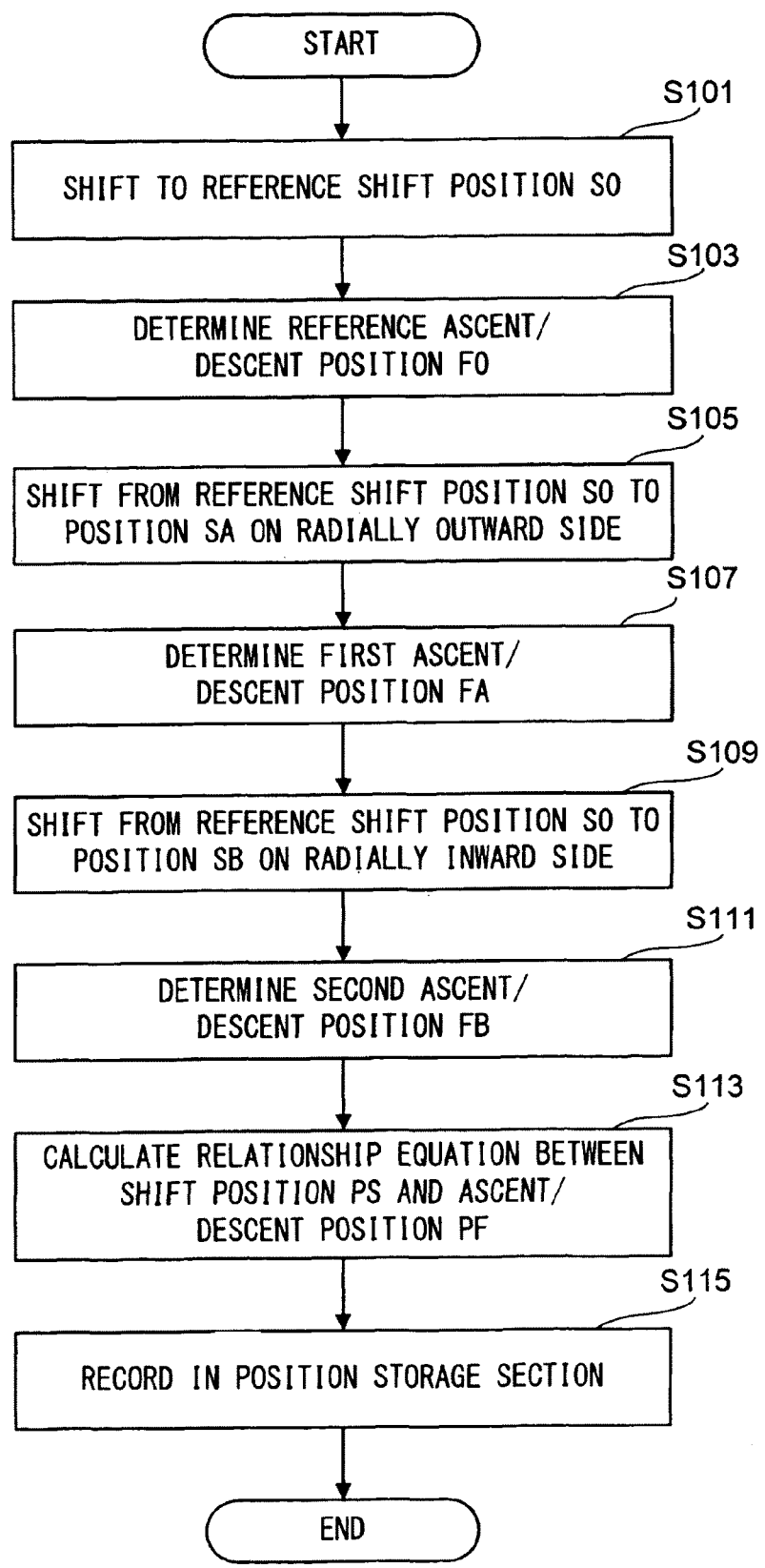
FIG. 7 is a flowchart showing an example of an operation for recording position information in the position storage section of the DVD player according to the invention.

FIG. 7 is a flowchart showing an example of the operation for recording position information in the position storage section 329 of the DVD player 100 according to the invention. The optical pickup 1 is first driven by the shift drive section 322 to the reference shift position S0 that is the shift position PS set by the shift set section 321 (S101). The reference ascent/descent position F0 is then determined as an appropriate ascent/descent position PF by the reference position acquisition section 323 based on the RF signal fed from the RF signal generating circuit 19 (S103).

The optical pickup 1 is then shifted by the first position acquisition section 324 to the first shift position SA to which the optical pickup 1 is shifted from the reference shift position S0 in a radially outward direction by the predetermined first travel distance (for example, 100 μm) (S105). The first ascent/descent position FA is then determined as an appropriate ascent/descent position PF by the first position acquisition section 324 based on the RF signal fed from the RF signal generating circuit 19 (S107). The optical pickup 1 is then shifted by the second position acquisition section 325 to the second shift position SB to which the optical pickup 1 is shifted from the reference shift position S0 in a radially inward direction by the predetermined second travel distance (for example, 100 μm) (S109). The second ascent/descent position FB is determined as an appropriate ascent/descent position PF by the second position acquisition section 325 based on the RF signal fed from the RF signal generating circuit 19 (S111).

The equation (see equation (2)) indicating the relationship between the shift position PS and the ascent/descent position PF is then determined by the position recording section 326 based on the reference shift position S0, the first shift position SA, the second shift position SB, the reference ascent/descent position F0, the first ascent/descent position FA and the second ascent/descent position FB (S113). The shift position PS and the ascent/descent position PF that are stored in the position storage section 329 are determined by the position recording section 326 based on the relationship equation determined in step S113, and the determined shift position PS and ascent/descent position PF are recorded in the position storage section 329 (S115), with the result that the process is completed.

Then, the focusing error signal FE indicating the amount of displacement of the focus position of light emitted from the LD 11 with respect to the position of the recording surface of the optical disc 2 and the tracking error signal TE indicating the amount of displacement of the focus position of light emitted from the LD 11 with respect to the center position of a track formed on the optical disc are generated through the optical pickup 1, and the RF signal is outputted. Then, the shift position PS of the optical pickup 1 in a radial direction of the optical disc 2 is set based on the generated tracking error signal TE, and the optical pickup 1 is driven in the radial direction of the optical disc 2 such that the optical pickup 1 is located at the set shift position PS. The ascent/descent position PF of the optical pickup 1 in a direction in which, it approaches or moves away from the optical disc 2 is previously stored in the position storage section 329 such that it corresponds to the shift position PS. The ascent/descent position PF corresponding to the set shift position PS is determined by being read from the position storage section 329, and the optical pickup 1 is driven in a direction in which it approaches or moves away from the optical disc 2 such that the optical pickup 1 is located at the determined ascent/descent position PF. Thus, it is possible to properly perform focus control during playback.

That is, the ascent/descent position PF of the optical pickup 1 in a direction in which it approaches or moves away from the optical disc 2 is previously stored in the position storage section 329 such that it corresponds to the shift position PS of the optical pickup 1 in a radial direction of the optical disc 2. The ascent/descent position PF corresponding to the set shift position PS is determined by being read from the position storage section 329. Since the optical pickup 1 is driven in a direction in which it approaches or moves away from the optical disc 2 such that the optical pickup 1 is located at the determined ascent/descent position PF, the optical pickup 1 can be driven to the appropriate ascent/descent position PF during playback by storing the appropriate ascent/descent position PF in the position storage section 329. Thus, it is possible to properly perform focus control during playback.

With the optical pickup 1 driven to the reference shift position S0 that is the set shift position PS, the reference ascent/descent position F0 is determined as an appropriate ascent/descent position PF based on the RF signal. With the optical pickup 1 shifted to the first shift position SA to which the optical pickup 1 is shifted from the reference shift position S0 in a radially outward direction by the predetermined first travel distance, the first ascent/descent position FA is determined as an appropriate ascent/descent position PF based on the RF signal. With the optical pickup 1 shifted to the second shift position SB to which the optical pickup 1 is shifted from the reference shift position S0 in a radially inward direction by the predetermined second travel distance, the second ascent/descent position FB is determined as an appropriate ascent/descent position PF based on the RF signal. Based on the reference shift position S0, the first shift position SA, the second shift position SB, the reference ascent/descent position F0, the first ascent/descent position FA and the second ascent/descent position FB, the shift position PS and the ascent/descent position PF that are stored in the position storage section 329 are determined, and the determined shift position PS and ascent/descent position PF are recorded in the position storage section 329. Thus, it is possible to properly perform focus control during playback.

That is, with the optical pickup 1 driven to the reference shift position S0 (the shift position where the focus position of light emitted from the LD 11 coincides with the center position of a track) that is the set shift position PS, the reference ascent/descent position F0 is determined as an appropriate ascent/descent position PF based on the RF signal; with the optical pickup 1 shifted to the first shift position SA to which the optical pickup 1 is shifted from the reference shift position S0 in a radially outward direction by the predetermined first travel distance (for example, 100 μm), the first ascent/descent position FA is determined as an appropriate ascent/descent position PF based on the RF signal; and with the optical pickup 1 shifted to the second shift position SB to which the optical pickup 1 is shifted from the reference shift position S0 in a radially inward direction by the predetermined second travel distance (for example, 100 μm), the second ascent/descent position FB is determined as an appropriate ascent/descent position PF based on the RF signal. Based on the reference shift position S0, the first shift position SA, the second shift position SB, the reference ascent/descent position F0, the first ascent/descent position FA and the second ascent/descent position FB, the shift position PS and the ascent/descent position PF that are stored in the position storage section 329 are determined. Since the determined shift position PS and ascent/descent position PF are recorded in the position storage section 329, the appropriate ascent/descent position PF can be recorded in the position storage section 329. Thus, it is possible to properly perform focus control during playback.

Furthermore, since ascent/descent positions PF are determined as the reference ascent/descent position F0, the first ascent/descent position FA and the second ascent/descent position FB when the level of the RF signal fed from the optical pickup 1 is the highest level, the reference ascent/descent position F0, the first ascent/descent position FA and the second ascent/descent position FB are appropriately determined. Hence, the ascent/descent positions PF are more appropriately recorded in the position storage section 329. Thus, it is possible to more properly perform focus control during playback.

Moreover, since the second travel distance is equal to the first travel distance (here, 100 μm), the ascent/descent positions PF can be more appropriately recorded in the position storage section 329. Thus, it is possible to more properly perform focus control during playback.

The present invention can be practiced in the following embodiments (A1) to (A5). (A1) Although this embodiment deals with the case where the optical disc playback device is the DVD player 100, any other optical disc playback device may be used as long as it reads information stored on an optical disc to achieve playback. For example, the optical disc playback device may be a personal computer that can perform playback from an optical disc.

(A2) Although this embodiment deals with the case where the MPU 32A in the DSP 32 functions as function units such as the shift set section 321, the shift drive section 322, the reference position acquisition section 323, the first position acquisition section 324, the second position acquisition section 325, the position recording section 326, the ascent/descent set section 327 and the ascent/descent drive section 328, at least one function unit of the shift set section 321, the shift drive section 322, the reference position acquisition section 323, the first position acquisition section 324, the second position acquisition section 325, the position recording section 326, the ascent/descent set section 327 and the ascent/descent drive section 328 may be formed by hardware such as a circuit.

(A3) Although this embodiment deals with the case where the reference position acquisition section 323, the first position acquisition section 324 and the second position acquisition section 325 determine, based on the RF signal fed from the RF signal generating circuit 19, the reference ascent/descent position F0, the first ascent/descent position FA and the second ascent/descent position FB, respectively, as appropriate ascent/descent positions PF, at least one function unit of the reference position acquisition section 323, the first position acquisition section 324 and the second position acquisition section 325 may determine, based on the focusing error signal FE fed from the focusing error signal generating circuit 18, the reference ascent/descent position F0, the first ascent/descent position FA and the second ascent/descent position FB as appropriate ascent/descent positions PF.

In this case, ascent/descent positions PF are preferably determined as the reference ascent/descent position F0, the first ascent/descent position FA and the second ascent/descent position FB when the level of the focusing error signal FE fed from the focusing error signal generating circuit 18 is zero.

(A4) Although this embodiment deals with the case where, based on the reference shift position S0, the first shift position SA, the second shift position SB, the reference ascent/descent position F0, the first ascent/descent position FA and the second ascent/descent position FB, the position recording section 326 determines the shift position PS and the ascent/descent position PF that are stored in the position storage section 329, the position recording section 326 may determine, based on information corresponding to two points specifying the graph G3 shown in FIG. 6A among the reference shift position S0, the first shift position SA, the second shift position SB, the reference ascent/descent position F0, the first ascent/descent position FA and the second ascent/descent position FB, the shift position PS and the ascent/descent position PF that are stored in the position storage section 329.

For example, based on the first shift position SA, the second shift position SB, the first ascent/descent position FA and the second ascent/descent position FB, the position recording section 326 may determine the shift position PS and the ascent/descent position PF that are stored in the position storage section 329. Based on the reference shift position S0, the first shift position SA, the reference ascent/descent position F0 and the first ascent/descent position FA, the position recording section 326 may determine the shift position PS and the ascent/descent position PF that are stored in the position storage section 329. In this case, the processing is simplified.

(A5) Although this embodiment deals with the case where, based on the reference shift position S0, the first shift position SA, the second shift position SB, the reference ascent/descent position F0, the first ascent/descent position FA and the second ascent/descent position FB, the position recording section 326 determines equation (2) indicating a straight line corresponding to the graph G3 shown in FIG. 6A, when three points on the graph G3 corresponding to the reference shift position S0, the first shift position SA, the second shift position SB, the reference ascent/descent position F0, the first ascent/descent position FA and the second ascent/descent position FB do not lie on a straight line, the position recording section 326 may determine an approximate straight line by the method of least squares or the like.

As will be understood from the above description, the embodiments described above include the configurations (B1) to (B6) of optical disc playback devices descried below.

(B1) An optical disc playback device that includes a pickup shining laser light from a light source onto an optical disc and converting light reflected from the optical disc into an electrical signal and that reads, through the pickup, information previously stored on the optical disc to achieve playback, the optical disc playback device further including: a signal generating section generating, through the pick up, a focusing error signal indicating the amount of displacement of the focus position of light emitted from the light source with respect to the position of the recording surface of the optical disc and a tracking error signal indicating the amount of displacement of the focus position of light emitted from the light source with respect to the center position of a track formed on the optical disc and outputting a RF (radio frequency) signal; a shift set section setting, based on the tracking error signal generated by the signal generating section, a shift position that is a position of the pickup in a radial direction of the optical disc; a shift drive section driving the pickup in the radial direction of the optical disc such that the pickup is located at the shift position set by the shift set section; a position storage section making an ascent/descent position of the pickup in a direction in which the pickup approaches or moves away from the optical disc correspond to the shift position and previously storing information of the ascent/descent position; an ascent/descent set section determining the ascent/descent position corresponding to the shift position set by the shift set section by reading the information of the ascent/descent position from the position storage section; and an ascent/descent drive section driving the pickup in the direction in which the pickup approaches or moves away from the optical disc such that the pickup is located at the ascent/descent position determined by the ascent/descent set section.

(B2) The optical disc playback device of the above-described configuration (B1), further including: a reference position acquisition section determining a reference ascent/descent position as an appropriate ascent/descent position based on the RF signal fed from the signal generating section with the pickup driven, by the shift drive section, to a reference shift position that is the shift position set by the shift set section; a first position acquisition section determining a first ascent/descent position as an appropriate ascent/descent position based on the RF signal fed from the signal generating section with the pickup shifted, from the reference shift position, in a radially outward direction by a predetermined first travel distance through the shift drive section; a second position acquisition section determining a second ascent/descent position as an appropriate ascent/descent position based on the RF signal fed from the signal generating section with the pickup shifted, from the reference shift position, in a radially inward direction by a predetermined second travel distance through the shift drive section; and a position recording section that, based on the reference shift position, the first travel distance, the second travel distance, the reference ascent/ descent position, the first ascent/descent position and the second ascent/descent position, determines the shift position and the ascent/descent position that are stored in the position storage section and that records the determined shift position and ascent/descent position in the position storage section.

(B3) The optical disc playback device of the above-described configuration (B2), characterized in that the reference position acquisition section, the first position acquisition section and the second position acquisition section determine ascent/descent positions as the reference ascent/descent position, the first ascent/descent position and the second ascent/descent position, respectively, when the level of the RF signal fed from the pickup is the approximately highest level.

(B4) The optical disc playback device of the above-described configuration (B1), further including: a reference position acquisition section determining a reference ascent/descent position as an appropriate ascent/descent position based on the focusing error signal fed from the signal generating section with the pickup driven, by the shift drive section, to a reference shift position that is the shift position set by the shift set section; a first position acquisition section determining a first ascent/descent position as an appropriate ascent/descent position based on the focusing error signal fed from the signal generating section with the pickup shifted, from the reference shift position, in a radially outward direction by a predetermined first travel distance through the shift drive section; a second position acquisition section determining a second ascent/descent position as an appropriate ascent/descent position based on the focusing error signal fed from the signal generating section with the pickup shifted, from the first reference shift position, in a radially inward direction by a predetermined second travel distance through the shift drive section; and a position recording section that, based on the reference shift position, the first travel distance, the second travel distance, the reference ascent/descent position, the first ascent/descent position and the second ascent/descent position, determines the shift position and the ascent/descent position that are stored in the position storage section and that records the determined shift position and ascent/descent position in the position storage section.

(B5) The optical disc playback device of the above-described configuration (B4), characterized in that the reference position acquisition section, the first position acquisition section and the second position acquisition section determine ascent/descent positions as the reference ascent/descent position, the first ascent/descent position and the second ascent/descent position, respectively, when the level of the focusing error signal fed from the pickup is approximately zero.

(B6) The optical disc playback device of any one of the above-described configurations (B2) to (B5), characterized in that the second travel distance is approximately equal to the first travel distance.

With the optical disc playback device of the above-described configuration (B1), the focusing error signal indicating the amount of displacement of the focus position of light emitted from a light source with respect to the position of the recording surface of an optical disc and the tracking error signal indicating the amount of displacement of the focus position of light emitted from the light source with respect to the center position of a track formed on the optical disc are generated through the pickup, and the RF (radio frequency) signal is outputted. Then, the shift position of the pickup in a radial direction of the optical disc is set based on the generated tracking error signal, and the pickup is driven in the radial direction of the optical disc such that the pickup is located at the set shift position. Then, the ascent/descent position of the pickup in a direction in which it approaches or moves away from the optical disc is previously stored in the position storage section such that it corresponds to the shift position. The ascent/descent position corresponding to the set shift position is determined by being read from the position storage section, and the pickup is driven in a direction in which it approaches or moves away from the optical disc such that the pickup is located at the determined ascent/descent position. Thus, it is possible to properly perform focus control during playback.

That is, the ascent/descent position of the pickup in a direction in which it approaches or moves away from the optical disc is previously stored in the position storage section such that it corresponds to the shift position of the pickup in a radial direction of the optical disc. The ascent/descent position corresponding to the set shift position is determined by being read from the position storage section, and the pickup is driven in a direction in which it approaches or moves away from the optical disc such that the pickup is located at the determined ascent/descent position. Hence, by storing the appropriate ascent/descent position in the position storage section, it is possible to drive the pickup to the appropriate ascent/descent position during playback. Thus, it is possible to properly perform focus control during playback.

With the optical disc playback device of the above-described configuration (B2), the reference ascent/descent position is determined as an appropriate ascent/descent position based on the RF signal with the pickup driven to the reference shift position that is the set shift position. With the pickup shifted from the reference shift position in a radially outward direction by the predetermined first travel distance, the first ascent/descent position is determined as an appropriate ascent/descent position based on the RF signal. With the pickup shifted from the reference shift position in a radially inward direction by the predetermined second travel distance, the second ascent/descent position is determined as an appropriate ascent/descent position based on the RF signal. Based on the reference shift position, the first travel distance, the second travel distance, the reference ascent/descent position, the first ascent/descent position and the second ascent/descent position, the shift position and the ascent/descent position that are stored in the position storage-section are determined, and the determined shift position and ascent/descent position are recorded in the position storage section. Thus, it is possible to more properly perform focus control during playback.

That is, with the optical pickup driven to the reference shift position (the shift position where the focus position of light emitted from the light source coincides with the center position of a track) that is the set shift position, the reference ascent/descent position is determined as an appropriate ascent/descent position based on the RF signal. With the optical pickup shifted from the reference shift position in a radially outward direction by the predetermined first travel distance (for example, 100 µm), the first ascent/descent position is determined as an appropriate ascent/descent position based on the RF signal. With the optical pickup shifted from the reference shift position in a radially inward direction by the predetermined second travel distance (for example, 100 µm), the second ascent/descent position is determined as an appropriate ascent/descent position based on the RF signal. Based on the reference shift position, the first travel distance, the second travel distance, the reference ascent/descent position, the first ascent/descent position and the second ascent/descent position, the shift position and the ascent/descent position that are stored in the position storage section are determined, and the determined shift position and ascent/descent position are recorded in the position storage section.

Hence, the appropriate ascent/descent position can be recorded in the position storage section. Thus, it is possible to more properly perform focus control during playback.

With the optical disc playback device of the above-described configuration (B3), ascent/descent positions are determined as the reference ascent/descent position, the first ascent/descent position and the second ascent/descent position, respectively, when the level of the RF signal fed from the optical pickup is an approximately highest level. Accordingly, the reference ascent/descent position, the first ascent/descent position and the second ascent/descent position are appropriately determined, and hence ascent/descent positions are more appropriately recorded in the position storage section. Thus, it is possible to more properly perform focus control during playback.

With the optical disc playback device of the above-described configuration (B4), the reference ascent/descent position is determined as an appropriate ascent/descent position based on the focusing error signal with the optical pickup driven to the reference shift position that is the set shift position. With the optical pickup shifted from the reference shift position in a radially outward direction by the predetermined first travel distance, the first ascent/descent position is determined as an appropriate ascent/descent position based on the focusing error signal. With the optical pickup shifted from the reference shift position in a radially inward direction by the predetermined second travel distance, the second ascent/descent position is determined as an appropriate ascent/descent position based on the focusing error signal. Based on the reference shift position, the first travel distance, the second travel distance, the reference ascent/descent position, the first ascent/descent position and the second ascent/descent position, the shift position and the ascent/descent position that are stored in the position storage section are determined, and the determined shift position and ascent/descent position are recorded in the position storage section. Thus, it is possible to more properly perform focus control during playback because of the following reason.

That is, with the optical pickup driven to the reference shift position (the shift position where the focus position of light emitted from the light source coincides with the center position of a track) that is the set shift position, the reference ascent/descent position is determined as an appropriate ascent/descent position based on the focusing error signal. With the optical pickup shifted from the reference shift position in a radially outward direction by the predetermined first travel distance (for example, 100 µm), the first ascent/descent position is determined as an appropriate ascent/descent position based on the focusing error signal. With the optical pickup shifted from the reference shift position in a radially inward direction by the predetermined second travel distance (for example, 100 µm), the second ascent/descent position is determined as an appropriate ascent/descent position based on the focusing error signal. Based on the reference shift position, the first travel distance, the second travel distance, the reference ascent/descent position, the first ascent/descent position and the second ascent/descent position, the shift position and the ascent/descent position that are stored in the position storage section are determined, and the determined shift position and ascent/descent position are recorded in the position storage section. Hence, the appropriate ascent/descent position can be recorded in the position storage section. Thus, it is possible to more properly perform focus control during playback.

With the optical disc playback device of the above-described configuration (B5), ascent/descent positions are determined as the reference ascent/descent position, the first ascent/descent position and the second ascent/descent position, respectively, when the level of the focusing error signal is approximately zero. Accordingly, the reference ascent/descent position, the first ascent/descent position and the second ascent/descent position are appropriately determined, and hence, ascent/descent positions can be more appropriately recorded in the position storage section. Thus, it is possible to more properly perform focus control during playback.

With the optical disc playback device of the above-described configuration (B6), the second travel distance is approximately equal to the first travel distance. Accordingly, ascent/descent positions are more appropriately recorded in the position storage section. Thus, it is possible to more properly perform focus control during playback.

What is claimed is:

1. An optical disc playback device that includes a pickup shining laser light from a light source onto an optical disc and converting light reflected from the optical disc into an electrical signal and that reads, through the pickup, information previously stored on the optical disc to achieve playback, the optical disc playback device comprising:

a signal generating section generating, through the pick up, a focusing error signal indicating an amount of displacement of a focus position of light emitted from the light source with respect to a position of a recording surface of the optical disc and a tracking error signal indicating an amount of displacement of the focus position of the light emitted from the light source with respect to a center position of a track formed on the optical disc and outputting a RF (radio frequency) signal;

a shift set section setting, based on the tracking error signal generated by the signal generating section, a shift position that is a position of the pickup in a radial direction, of the optical disc;

a shift drive section driving the pickup in the radial direction of the optical disc such that the pickup is located at the shift position set by the shift set section;

a position storage section in which an ascent/descent position of the pickup in a direction in which the pickup approaches or moves away from the optical disc is made to correspond to the shift position and information of the ascent/descent position is stored before the playback;

an ascent/descent set section determining the ascent/descent position corresponding to the shift position set by the shift set section by reading the information of the ascent/descent position from the position storage section during the playback;

an ascent/descent drive section driving the pickup in the direction in which the pickup approaches or moves away from the optical disc such that the pickup is located at the ascent/descent position determined by the ascent/descent set section;

a reference position acquisition section determining a reference ascent/descent position as an appropriate ascent/descent position based on the RF signal outputted from the signal generating section with the pickup driven, by the shift drive section, to a reference shift position that is the shift position set by the shift set section;

a first position acquisition section determining a first ascent/descent position as an appropriate ascent/descent position based on the RF signal outputted from the signal generating section with the pickup shifted, from the reference shift position, in a radially outward direction by a predetermined first travel distance through the shift drive section;

a second position acquisition section determining a second ascent/descent position as an appropriate ascent/descent position based on the RF signal outputted from the signal generating section with the pickup shifted, from the reference shift position, in a radially inward direction by a predetermined second travel distance through the shift drive section; and a position recording section
that, based on the reference shift position, the first travel distance, the second travel distance, the reference ascent/descent position, the first ascent/descent position and the second ascent/descent position, determines the shift position and the ascent/descent position that are stored in the position storage section and that records the determined shift position and ascent/descent position in the position storage section.

2. The optical disc playback device of claim 1,
wherein the reference position acquisition section, the first position acquisition section and the second position acquisition section determine ascent/descent positions as the reference ascent/descent position, the first ascent/descent position and the second ascent/descent position, respectively, when a level of the RF signal outputted from the pickup is an approximately highest level.

3. The optical disc playback device of claim 2,
wherein the second travel distance is approximately equal to the first travel distance.

4. The optical disc playback device of claim 1,
wherein the second travel distance is approximately equal to the first travel distance.

5. An optical disc playback device that includes a pickup shining laser light from a light source onto an optical disc and converting light reflected from the optical disc into an electrical signal and that reads, through the pickup, information previously stored on the optical disc to achieve playback, the optical disc playback device comprising:

a signal generating section generating, through the pick up, a focusing error signal indicating an amount of displacement of a focus position of light emitted from the light source with respect to a position of a recording surface of the optical disc and a tracking error signal indicating an amount of displacement of the focus position of the light emitted from the light source with respect to a center position of a track formed on the optical disc and outputting a RF (radio frequency) signal;

a shift set section setting, based on the tracking error signal generated by the signal generating section, a shift position that is a position of the pickup in a radial direction, of the optical disc;

a shift drive section driving the pickup in the radial direction of the optical disc such that the pickup is located at the shift position set by the shift set section;

a position storage section in which an ascent/descent position of the pickup in a direction in which the pickup approaches or moves away from the optical disc is made to correspond to the shift position and information of the ascent/descent position is stored before the playback;

an ascent/descent set section determining the ascent/descent position corresponding to the shift position set by the shift set section by reading the information of the ascent/descent position from the position storage section during the playback;

an ascent/descent drive section driving the pickup in the direction in which the pickup approaches or moves away from the optical disc such that the pickup is located at the ascent/descent position determined by the ascent/descent set section;

a reference position acquisition section determining a reference ascent/descent position as an appropriate ascent/descent position based on the focusing error signal outputted from the signal generating section with the pickup driven, by the shift drive section, to a reference shift position that is the shift position set by the shift set section;

a first position acquisition section determining a first ascent/descent position as an appropriate ascent/descent position based on the focusing error signal outputted from the signal generating section with the pickup shifted, from the reference shift position, in a radially outward direction by a predetermined first travel distance through the shift drive section;

a second position acquisition section determining a second ascent/descent position as an appropriate ascent/descent position based on the focusing error signal outputted from the signal generating section with the pickup shifted, from the reference shift position, in a radially inward direction by a predetermined second travel distance through the shift drive section; and a position recording section
that, based on the reference shift position, the first travel distance, the second travel distance, the reference ascent/descent position, the first ascent/descent position and the second ascent/descent position, determines the shift position and the ascent/descent position that are stored in the position storage section and that records the determined shift position and ascent/descent position in the position storage section.

6. The optical disc playback device of claim 5,
wherein the reference position acquisition section, the first position acquisition section and the second position acquisition section determine ascent/descent positions as the reference ascent/descent position, the first ascent/descent position and the second ascent/descent position, respectively, when a level of the focusing error signal outputted from the pickup is approximately zero.

7. The optical disc playback device of claim 6,
wherein the second travel distance is approximately equal to the first travel distance.

8. The optical disc playback device of claim 5,
wherein the second travel distance is approximately equal to the first travel distance.

* * * * *